United States Patent
Droz et al.

[11] Patent Number: 5,860,303
[45] Date of Patent: Jan. 19, 1999

[54] IGNITION SAFETY INTERLOCK

[75] Inventors: Timothy K. Droz; Felix P. Adler, both of Clinton Township, Mich.

[73] Assignee: Teleflex Incorporated, Plymouth Meeting, Pa.

[21] Appl. No.: 920,855

[22] Filed: Aug. 29, 1997

[51] Int. Cl.[6] .................................................. B60R 25/06
[52] U.S. Cl. .................................. 70/247; 70/248; 70/252
[58] Field of Search ............................. 70/245–248, 252; 192/4 A; 74/475, 477, 878

[56]  References Cited

U.S. PATENT DOCUMENTS

| | | | |
|---|---|---|---|
| 4,712,397 | 12/1987 | Niskanen | 70/248 |
| 4,724,722 | 2/1988 | Beauch et al. | 70/248 X |
| 4,905,802 | 3/1990 | Gotoh | 70/247 X |
| 4,932,493 | 6/1990 | Sakurai et al. | 70/248 X |
| 4,938,042 | 7/1990 | Muramatsu | 70/245 |
| 4,945,740 | 8/1990 | Kawano et al. | 70/248 |
| 4,959,982 | 10/1990 | Mauz et al. | 70/248 |
| 5,031,737 | 7/1991 | Dzioba et al. | 192/4 A |
| 5,036,962 | 8/1991 | Amagasa | 70/248 X |
| 5,078,242 | 1/1992 | Ratke et al. | 70/248 X |
| 5,161,657 | 11/1992 | Papehagen et al. | 192/4 A |
| 5,197,312 | 3/1993 | Akutsu | 70/247 |
| 5,197,356 | 3/1993 | Kobayashi et al. | 70/245 X |
| 5,211,271 | 5/1993 | Osborn et al. | 192/4 A |
| 5,218,847 | 6/1993 | Dieden et al. | 70/252 X |
| 5,226,303 | 7/1993 | Dieden et al. | 70/252 X |
| 5,293,763 | 3/1994 | Asano et al. | 70/248 |
| 5,309,744 | 5/1994 | Kito et al. | 70/248 X |
| 5,428,977 | 7/1995 | Knape | 70/252 X |
| 5,588,514 | 12/1996 | Snell | 70/248 X |
| 5,647,818 | 7/1997 | Moody | 70/248 X |
| 5,657,654 | 8/1997 | Hoebel | 70/247 |
| 5,662,001 | 9/1997 | Smale | 70/247 X |
| 5,685,405 | 11/1997 | Morikawa et al. | 70/245 X |

FOREIGN PATENT DOCUMENTS

| | | | |
|---|---|---|---|
| 4037542 | 7/1991 | Germany | 70/248 |
| 103558 | 4/1989 | Japan | 70/248 |

*Primary Examiner*—Suzanne Dino Barrett
*Attorney, Agent, or Firm*—Howard & Howard

[57]  ABSTRACT

A cable (52) operated ignition safety interlock assembly (50) for an automobile having an ignition switch (16) and an automatic transmission having a gear selector lever (14). The gear selector lever (14) includes a detent (20) manually moveable between a Home position, associated with the Park position of the gear selector lever (14), and a plurality of displaced positions associated with each of the drive positions of the gear selector lever (14). An interlock (50) restrains the ignition switch (16) in its Run position until the gear selector lever (14) is moved to its Park position to remind the driver that the transmission is not safety engaged in the Park condition. The interlock (50) includes a cable (52) having a first end (56) operatively connected to the detent (20) of the gear selector lever (14) and a second end (58) operatively engagable with the ignition switch (16) to restrain the ignition switch (16) in the Run position, and thus to prevent removal of the key from the ignition switch (16). The second end (58) of the cable (52) includes a plunger tip (70) which is moved to and remains in a fully extended condition, restraining the ignition switch (16) in the Run position, when the detent (20) is in any of the plurality of drive positions. The plunger tip (70) automatically moves to a retracted condition, disengaged from the ignition switch (16), when the detent (20) is returned to the Home position thereby allowing the ignition switch (16) to be moved to the Off position. When the gear selector lever (14) is moved to Park, the plunger tip (70) is retracted and disengaged from the ignition switch (16), permitting the ignition switch (16) to be turned Off and the key removed.

10 Claims, 3 Drawing Sheets

5,860,303

IGNITION SAFETY INTERLOCK

BACKGROUND OF THE INVENTION

1. Field of the Invention

In an automobile, a cable operated interlock between the gear selector lever of an automatic transmission and the ignition switch prevents complete return of the ignition switch to its Off position, and thus prevents removal of the ignition key, until the gear selector lever is first returned to its Park position.

2. Description of Related Art

An important safety consideration for automobiles equipped with an automatic transmission is that the transmission be placed in the Park condition before the driver exits the vehicle. Failure to place the transmission in Park may allow the automobile to roll forward or backward while unattended.

To reduce the incidence of this potentially unsafe situation, the prior art has taught to equip an automobile with an interlock device to prevent removal of the ignition key from the ignition switch lock cylinder until the gear selector lever of the automatic transmission has been fully moved into its Park position. This is accomplished usually by preventing the ignition switch cylinder from moving fully to its Off position until the gear selector lever is in Park. While many of the prior art interlock systems perform satisfactorily, there is nevertheless a continued need to condense the packaging and to reduce weight and fabrication costs.

SUMMARY OF THE INVENTION

The subject invention relates to a cable operated ignition safety interlock assembly for an automobile having an ignition switch and an automatic transmission. According to the invention, a gear selector lever is moveable between a Park position and a plurality of drive positions for remotely controlling the automatic transmission. The gear selector lever includes a detent manually moveable between a Home position, associated with the Park position of the gear selector lever, and a plurality of displaced positions associated with each of the drive positions of the gear selector lever. An ignition switch is moveable between Off and Run positions for selectively energizing the ignition system of the automobile. An interlock is provided for restraining the ignition switch in the Run position until the gear selector lever is moved to the Park position. By restraining the ignition switch in the Run position until the gear selector lever is moved to the Park position, the ignition key cannot be removed and thus will serve to remind the driver that the transmission is not safety engaged in the Park condition. The interlock includes a flexible motion transmitting cable slidably extending between first and second ends thereof. The first end of the cable operatively connected to the detent of the gear selector lever for movement therewith between the Home and displaced positions. The second end of the cable is operatively engagable with the ignition switch to restrain the ignition switch in the Run position, and thus to prevent removal of the key from the ignition switch.

The improvement of the subject invention resides in the second end of the cable including a plunger tip which is moved to and remains in a fully extended condition, restraining the ignition switch in the Run position, when the detent is in any of the plurality of drive positions. The plunger tip automatically moves to a retracted condition, disengaged from the ignition switch, when the detent is returned to the Home position thereby allowing the ignition switch to be moved to the Off position. In other words, when the gear selector lever is moved to Park, the plunger tip is retracted and disengaged from the ignition switch, which permits the ignition switch to be turned Off and the key removed. The plunger tip construction is particularly compact and durable, and generally less expensive to fabricate than prior art designs.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
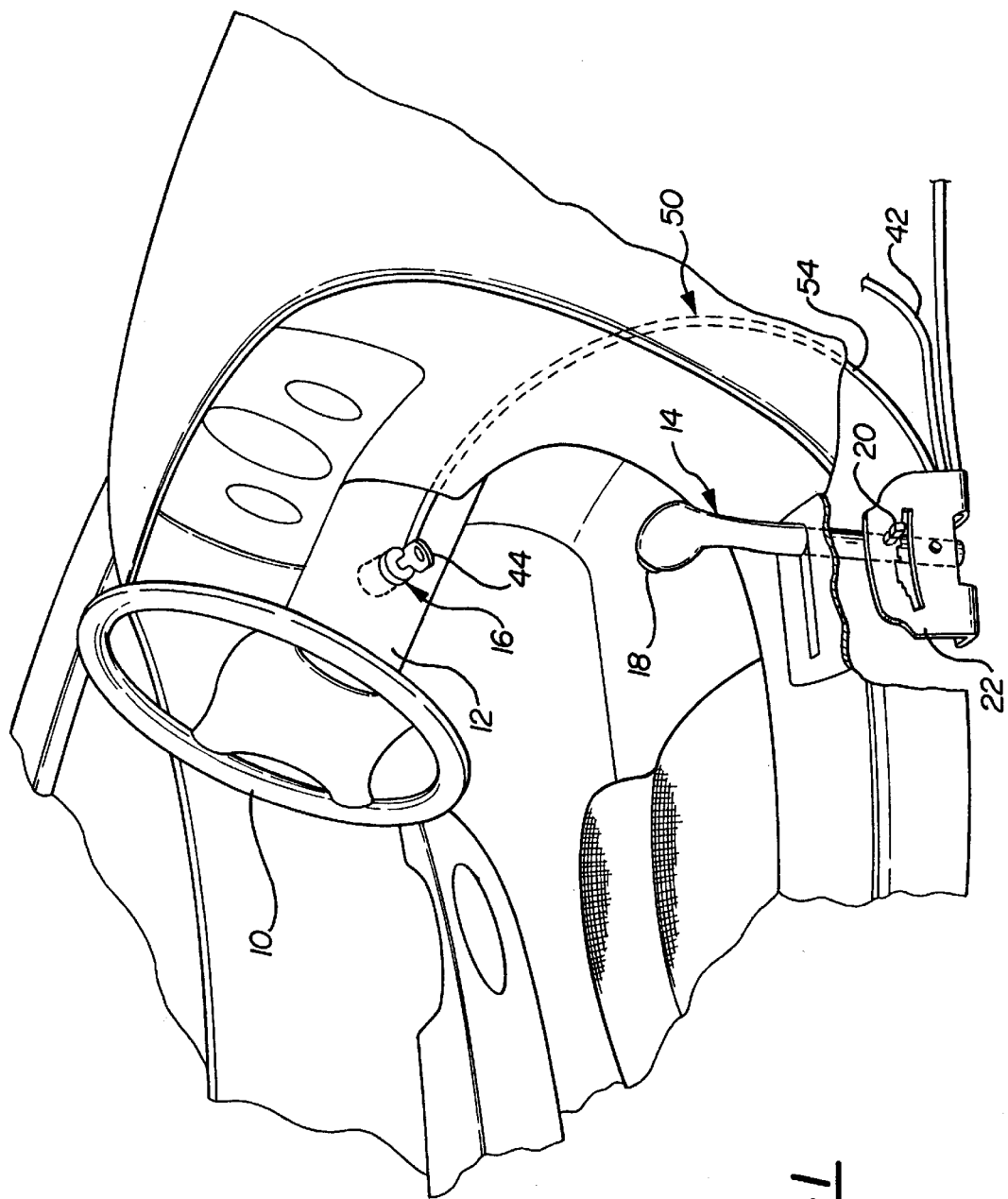
FIG. 1 is a fragmentary perspective view of a passenger compartment in an automobile showing a gear selector lever for an automatic transmission and an ignition switch operatively interconnected by the subject interlock cable assembly.

Referring to the Figures, wherein like numerals indicate like or corresponding parts throughout the several views, a representative passenger compartment for an automobile is illustrated in FIG. 1. The passenger compartment includes a steering wheel 10 supported on a steering column 12, and a console-type gear selector lever, generally indicated at 14, for an automatic transmission (not shown). An ignition switch, generally indicated at 16, is shown extending from the column 12, however those skilled in the art will appreciate that the ignition switch 16 could be mounted in numerous alternative locations, including the instrument panel.

The gear selector lever 14 is moveable between a Park position, associated with the Park condition of the transmission, and a plurality of drive positions, e.g., Reverse, Drive, etc., for remotely controlling the automatic transmission. The gear selector lever 14 includes a T-shaped or other economically shaped gripping end having thumb button actuator 18 extending outwardly therefrom. The thumb button actuator 18 is depressed before moving the gear shift lever 14 between the Park and drive positions or between different drive positions, as is well known in the art. This is accomplished by operatively connecting the thumb button actuator 18 to a detent 20, such as by a mechanical linkage (not shown), so that the detent 20 moves in response to the thumb button actuator 18 between a Home position and a plurality of displaced positions. The Home position is associated with the Park position of the gear selector lever 14 and the plurality of displaced positions are associated with each of the drive positions of the gear selector lever 14.

Figure 2:
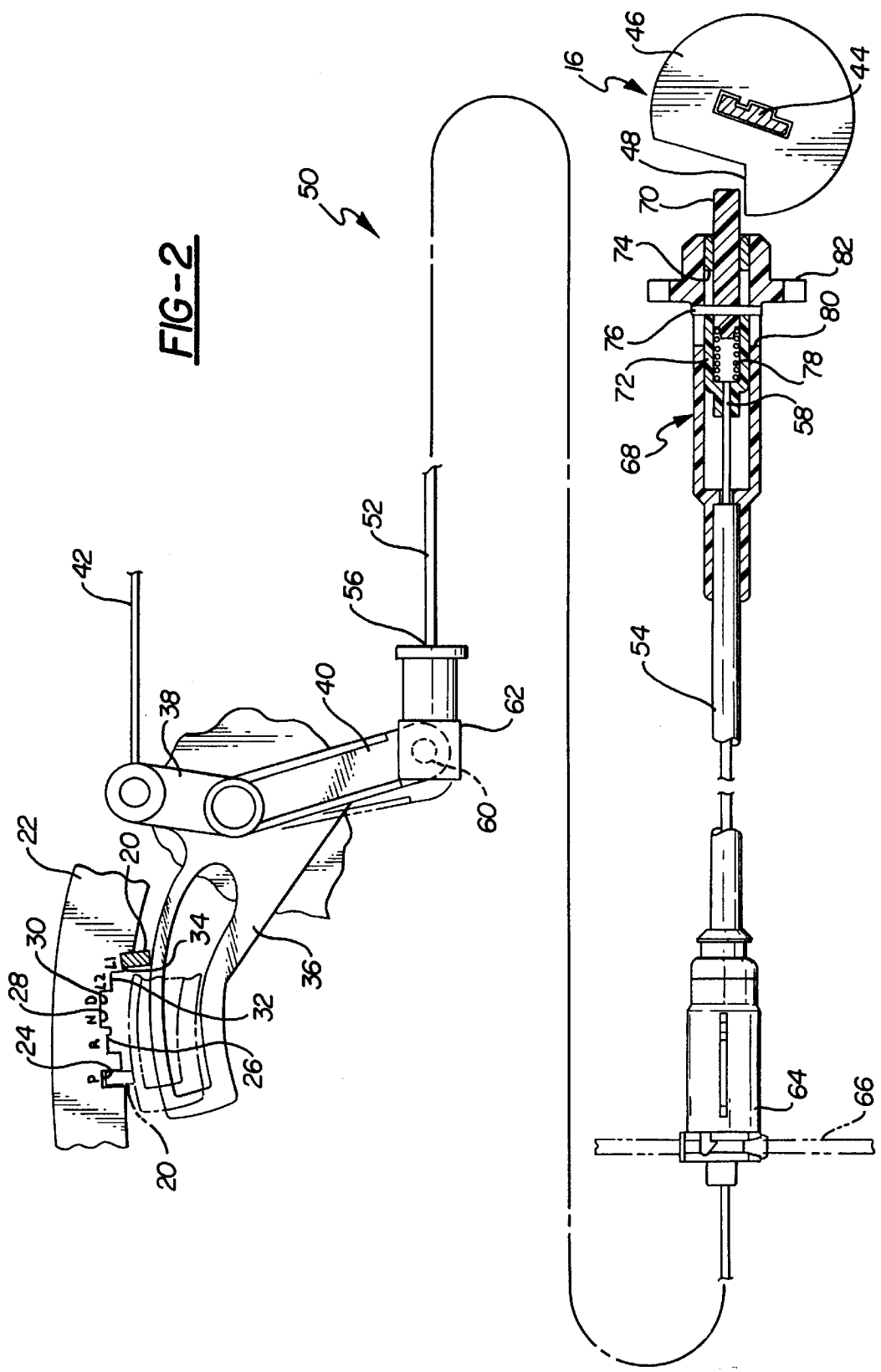
FIG. 2 is a simplified schematic view of the interlock cable assembly according to the subject invention having a first end thereof connected to the detent and bell crank mechanism of the gear selector lever and a second end thereof engagable with the lock cylinder of the ignition switch.

The detent 20, in turn, is constrained within a selective series of notches 24–34 in a detent plate 22. As best shown in FIG. 2, these notches 24–34 correspond, respectively, to the Park, Reverse, Neutral, Drive, Low 2, and Low 1 positions of the gear selector lever 14, however those skilled in the art will appreciate other transmission gear configurations. In other words, when the gear selector lever 14 is in its Park position, the detent 20 rests in its Home position in notch 24. However, when the gear selector lever 14 is in any of its drive positions, the detent 20 is displaced (radially, or vertically, relative to the Home position) and rests in any of the notches 26–34.

The gear selector lever 14 also includes a bell crank 36 which is controlled by the detent 20. The bell crank 36 has two separate arms 38, 40, as shown in FIG. 2. One of the arms 38 is attached to a BTSI cable 42, which in turn is operatively controlled by, either electrically or mechanically, to the brake pedal (not shown). As is well known in the art, when the gear selector lever 14 is in the Park position and the brake pedal is unactuated, the cable 38 is tensioned causing the bell crank 36 to rotate into the position shown in phantom in FIG. 2. This effectively barricades the detent 20 in the Home notch 24 of the detent plate 22, thereby immobilizing the thumb button actuator 18. The gear selector lever 14 cannot be moved from the Park position in this condition. However, when the driver depresses the brake pedal, tension on the BTSI cable 42 is released, thereby allowing pressure on the thumb button actuator 18 to displace the detent 20 out of the Home notch 24.

The ignition switch 16 is of the conventional type, being moveable between an Off and one or more Run positions for selectively energizing an ignition system of the automobile. The ignition switch 16 is controlled by a key 44, and includes a rotatable cylinder 46 having a notch 48 formed therein. Rotation of the key 44 in the ignition switch 16 causes the cylinder 46 between the Off and Run positions as well. The key 44 can only be removed from the cylinder 46 when in the Off position, i.e., the key 44 is restrained in the cylinder 46 while in (any of) the Run position(s).

A cable operated ignition safety interlock assembly, generally shown at 50, is provided for restraining the ignition switch 16 in the Run position(s) until the gear selector lever 14 is moved to the Park position. Once the gear selector lever 14 is in the Park position, the ignition switch 16 can be freely moved to Off and the key 44 removed therefrom. This safety feature serves as a reminder to the driver to engage the transmission in the Park condition before exiting the vehicle.

The interlock 50 includes a flexible motion transmitting cable 52 slidably supported along a longitudinal axis thereof within a protective conduit 54. The cable 52 includes first 56 and second 58 ends which extend from either end of the conduit 54. The first end 56 is operatively connected to the detent 20, via the one arm 40 of the bell crank 36, for movement therewith as the detent 20 moves between its Home and displaced positions. More specifically, a stud 60 extends from the one arm 40 of the bell crank 36, and a terminal connector 62 on the cable 52 attaches to the stud 60. The second end 58 of the cable 52 operatively engages the notch 48 in the cylinder 46 when the gear selector lever 14 is not in the Park position to selectively restrain the ignition switch 16 in the Run position.

The conduit 54 has opposite ends, one of the ends comprising an end fitting 64 adjacent the first end 56 of the cable 52 for attachment to a bracket 66, and the other of the ends comprising a housing 68 adjacent the second end 58 of the cable 52. The second end 58 of the cable 52 includes a plunger tip 70 which is moved to and remains in a fully extended condition (relative to the housing 68) restraining the ignition switch 16 in the Run position when the detent 20 is in any of the plurality of drive positions and which automatically moves to a retracted condition, disengaged from the ignition switch 16, when the detent 20 is returned to the Home position thereby allowing the ignition switch 16 to be moved to the Off position. The plunger tip 70 is shown in the extended condition in FIGS. 2 and 4, and in the retracted condition in FIG. 3.

The second end 58 of the cable 52 includes a barrel 72 axially slidably disposed in the housing 68. The barrel 72, in turn, has an inner bore axially slidably supporting the plunger tip 70. The barrel 72 includes an axially extending lost motion slot 74, and the plunger tip 70 is provided with a cross pin 76 slidably received in the lost motion slot 74. A compression spring 78 is operatively disposed between the plunger tip 70 and the barrel 72 to urge the plunger tip 70 toward its extended condition. The housing 68 also includes an axially extending locator slot 80, with the cross pin 76 being simultaneously slidably disposed in the locator slot 80 as well. In this manner, when the detent 20 is in the Home position, the bell crank 36 is in the phantom position as shown in FIG. 2 which pulls the cable 52 thereby retracting the plunger tip 70 to the position shown in FIG. 3. However, when the detent 20 is any of the displaced positions, the bell crank 36 is in the solid position as shown in FIG. 2 which pushes the cable 52 thereby extending the plunger tip 70 to the position shown in FIG. 4. The housing 68 includes a mounting flange 82 for attaching via fasteners to the steering column 12 or other such bracket feature adjacent the ignition switch 16.

A particularly advantageous feature of the subject invention is that the plunger tip 70 is moved a fixed distance between its extended (FIG. 4) and retracted (FIG. 3) positions which is less than the distance moved by the cable 52 in response to the bell crank 36, i.e., there is lost motion between the cable 52 and the plunger tip 70 which allows the plunger tip 70 to remain in its extended position while the gear selector lever 14 moves among its various drive positions. Because the Home position of the detent 20 causes the greatest displacement of the cable 52, the plunger tip 70 is never retracted from the notch 48 until the gear shift lever 14 is in Park. Therefore, the cross pin 76 and dual slot 74, 80 configuration, coupled with the spring 78, provide a compact and particularly durable construction which will not allow retraction of the plunger tip 70 from the extended position until the detent 20 is fully seated in its Home position.

Figure 3:
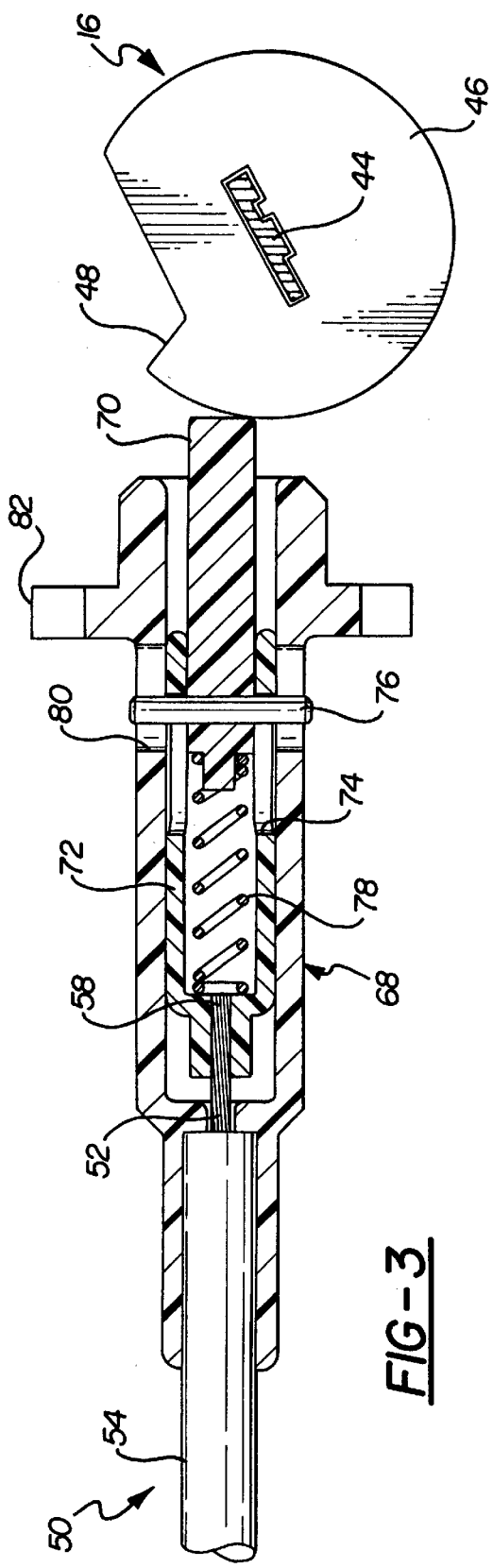
FIG. 3 is an enlarged cross-sectional view of the plunger tip of the interlock cable assembly in its retracted condition disengaged from the ignition switch as occurring when the gear selector lever is in its Park position.
Figure 4:
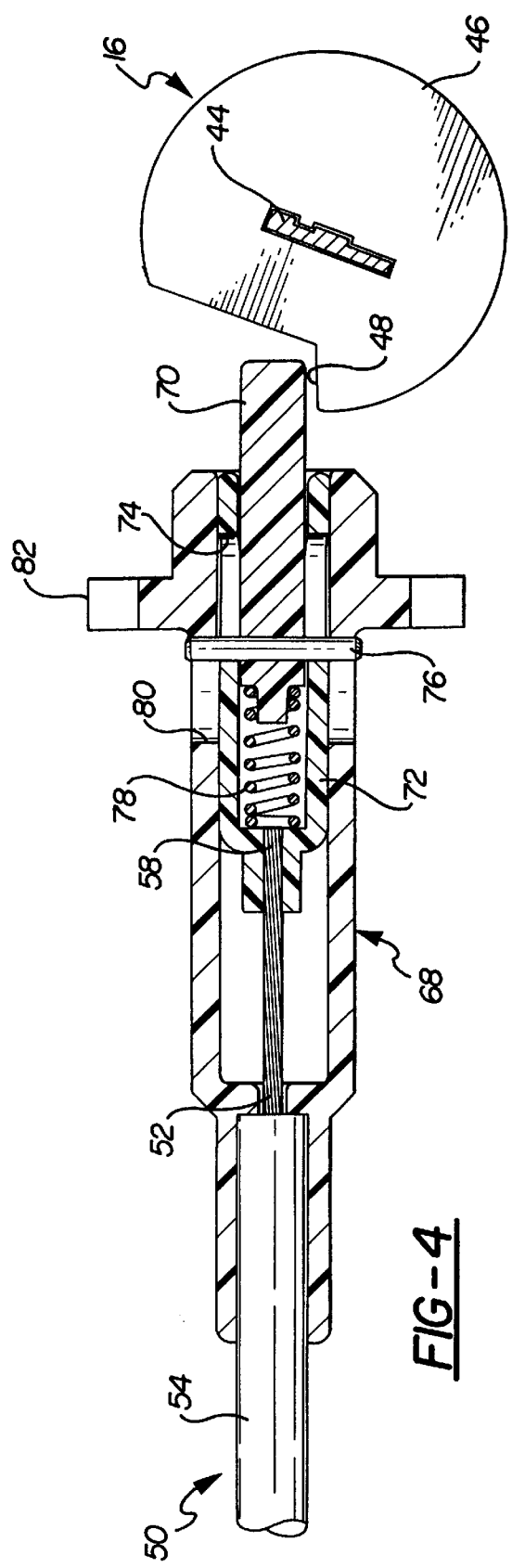
FIG. 4 is a cross-sectional view as in FIG. 3 showing the plunger tip of the interlock cable assembly in its fully extended condition restraining the ignition switch in the Run position as occurring when the gear selector lever is in any of its drive positions.

Referring to FIG. 4, the plunger tip 70 is shown in the fully extended position. The barrel 72 is shown in its extended most condition, which corresponds to the Low 1 position of the gear selector lever 14 due to the extreme shallow depth of the corresponding notch 34 in the detent plate 22, as shown in solid in FIG. 2. If the gear selector lever 14 is moved to other drive positions, such as one of the Reverse, Drive, or Neutral positions where the detent 20 is seated in a deeper notch 26, 28, 30, the bell crank 36 will be pivoted causing the cable 52 to be pulled a proportional distance. This, in turn, pulls the barrel 72 but does not affect the extended position of the plunger tip 70 because of the lost motion slot 74, i.e., the spring 78 urges the cross pin 76 to remain pressed against the forward most edge of the locator slot 80 in the housing 68. It is only as the full movement of the detent 20 into the Home position, i.e., the Park notch 24 of the detent plate 22, which brings the forward edge of the lost motion slot 74 to bear against the cross pin 76, pulling it rearwardly within the locator slot 80. This condition is illustrated in FIG. 3.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A cable operated ignition safety interlock assembly for an automobile having an ignition switch (16) and an automatic transmission, said assembly comprising: a gear selector lever (14) moveable between a Park position and a plurality of drive positions for remotely controlling an automatic transmission of an automobile; said gear selector lever (14) including a detent (20) manually moveable between a Home position associated with said Park position of said gear selector lever (14) and a plurality of displaced positions associated with each of said drive positions of said gear selector lever (14); an ignition switch (16) moveable between Off and Run positions for selectively energizing an ignition system of the automobile; an interlock (50) for restraining said ignition switch (16) in said Run position until said gear selector lever (14) is moved to said Park position; said interlock (50) including a flexible motion transmitting cable (52) slidably extending between first (56) and second (58) ends thereof, said first ends (56) operatively connected to said detent (20) for movement therewith between said Home and displaced positions and said second end (58) operatively engagable with said ignition switch (16) to restrain said ignition switch (16) in said Run position; said interlock (50) including a conduit (54) having opposite ends and slidably supporting said cable (52) along a longitudinal axis thereof; said conduit (:54) including a housing (68) extending from one end thereof adjacent said second end (58) of said cable (52); characterized by a barrel (72) having an inner bore and attached to said second end (58) of said cable (52) and slidably disposed in said housing (68), a plunger tip (70) slidably supported in said inner bore of said barrel (72), a compression spring (78) disposed between said plunger tip (70) and said barrel (72), a first lost motion connection between said plunger tip (70) and said barrel (72), and a second lost motion connection between said barrel (72) and said housing (68) whereby said plunger tip (70) is moved to and remains in a fully extended condition restraining said ignition switch (16) in said Run position when said detent (20) is in any of said plurality of drive positions and moves to a retracted condition disengaged from said ignition switch (16) when said detent (20) is returned to said Home position thereby allowing said ignition switch (16) to be moved to said Off position.

2. An assembly as set forth in claim 1 wherein said first lost motion connection includes an axially extending lost motion slot (74) in said barrel (72), and a cross pin (76) supported by said plunger tip (70) and slidably received in said lost motion slot (74).

3. An assembly as set forth in claim 2 wherein said second lost motion connection includes an axially extending locator slot (80) in said housing (68), said cross pin (76) being slidably disposed in said locator slot (80).

4. An assembly as set forth in claim 3 wherein said housing (68) includes a mounting flange (82).

5. An assembly as set forth in claim 1 wherein said gear selector lever (14) includes a thumb button actuator (18) and a bell crank (36) operatively connected to said thumb button actuator (18), said detent (20) operatively engaging said bell crank (36).

6. An assembly as set forth in claim 5 wherein said bell crank (36) includes a stud (60) extending therefrom, and said first end (56) of said cable (52) including a terminal (62) connected to said stud (60).

7. An assembly as set forth in claim 1 wherein said ignition switch (16) includes a rotatable cylinder (46) having a notch (48) formed therein.

8. An ignition safey interlock cable assembly (50) for an automobile, said assembly (50) comprising: a conduit (54) having opposing ends; a housing (68) extending from one of said ends of said conduit (54); a flexible motion transmitting cable (52) slidably supported in said conduit (54) and extending between first (56) and second (58) ends thereof; a barrel (72) attached to said second end (58) of said cable (52) and having an inner bore and axially extending lost motion slot (74); and characterized by a plunger tip (70) axially slidably supported in said barrel (72), said plunger tip (70) including a cross pin (76) slidably received in said lost motion slot (74) of said barrel (72); a compression spring (78) operatively disposed between said plunger tip (70) and said barrel (72); said housing (68) including an axially extending locator slot (80), said cross pin (76) being slidably disposed in said locator slot (80).

9. An assembly (50) as set forth in claim 8 wherein said housing (68) includes a mounting flange (82).

10. An ignition safety interlock cable assembly (50) for an automobile, said assembly (50) comprising: a conduit (54) having opposing ends; a housing member (68) attached to one of said ends of said conduit (54); a flexible motion transmitting cable (52) slidably supported in said conduit (54) and extending between first (56) and second (58) ends thereof; a barrel member (72) attached to said second end (58) of said cable (52); a plunger member (70) axially slidably supported by and extending from said barrel member (72); and a compression spring (78) urging said plunger member (70) to extend from said barrel member (72) as said barrel member (72) is slidably supported by said housing member (68).

* * * * *